Figure 1:
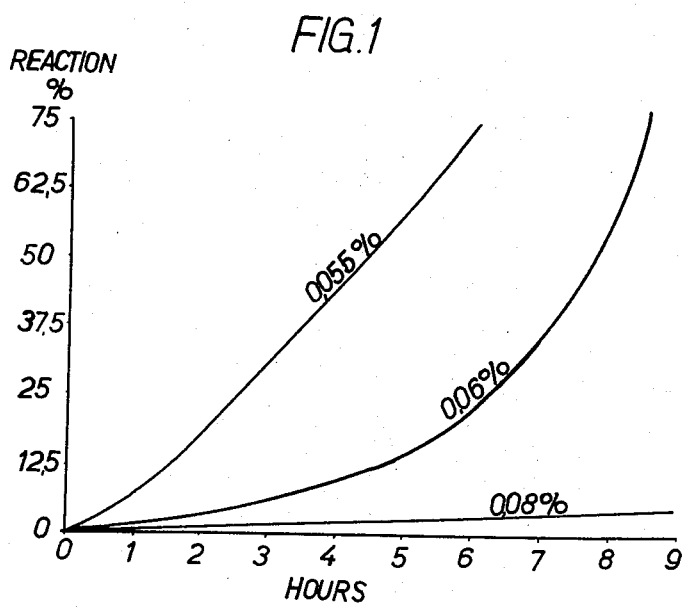

INVENTORS:
HUGO MALZ, DIETRICH ROSAHL,

United States Patent Office 2,962,475
Patented Nov. 29, 1960

---

2,962,475

POLYMERIZATION OF CHLOROPRENE

Hügo Malz, Leverkusen, and Dietrich Rosahl, Koln-Flittard, Germany, assignors to Farbenfabriken Bayer Aktiengesellschaft, Leverkusen, Germany, a corporation of Germany Filed Jan. 16, 1958, Ser. No. 709,392

Claims priority, application Germany Jan. 25, 1957

10 Claims. (Cl. 260—45.8)

The present invention relates to the polymerization of chloroprene (2-chlor-1,3-butadiene).

Monomeric chloroprene shows an extremely ready tendency to polymerize so that handling, transport and storage thereof are particularly difficult. It is consequently necessary to protect the monomeric product from incontrollable polymerization by adding stabilizers which must be removed prior to the polymerization, either by distillation or by other processes, or the stabilizing action thereof must be eliminated by adding activators. Antioxidants are mainly used as stabilizers for this purpose, these being aromatic hydroxy compounds and amino compounds or their derivatives. Phenothiazine, p-t-butyl pyrocatechol, bis-(2-hydroxy-3-tert.-butyl 5-methyl phenyl)-methane, bis-(2-hydroxy-3-cyclohexyl-5-methyl phenyl)-methane, alkyl phenol sulphides or alkylated diphenylamines have inter alia proved satisfactory for this purpose.

Chloroprene stabilized with these compounds can no longer be activated for polymerization purposes with the usual quantities of the peroxide compounds normally employed as polymerization activators.

For example with chloroprene which is stabilized with phenothiazine, the simultaneous use of peroxide compounds and coactivators leads to less satisfactory results, since slight fluctuations in the stabilizer content, such as are caused, for example by a partial inactivity of the stabilizer during storage or during transport, lead to great variations in polymerization velocities, this making it considerably more difficult for polymerization to be carried out continuously. The fluctuations in the content of stabilizer, which cause these differences in the polymerization velocity, are below the limit which can be determined by analysis. Consequently, it is frequently necessary for the monomeric chloroprene to be freed by distillation from the stabilizers prior to being polymerized with peroxide compounds.

It has now been found that these difficulties can be overcome if nitrogen sulphides and/or hepta-sulphur imide ($S_7NH$) or derivatives of these compounds are used as catalysts for the polymerization or copolymerization of chloroprene. The common feature of these compounds, all of which are supposed to have a ring-like structure, is the atom grouping $$S=N-S \text{ or } S-N-S$$
$$\phantom{S=N-S \text{ or } S-}|$$
$$\phantom{S=N-S \text{ or } S-}X$$

which is present at least once in the molecule, X representing hydrogen, a metal atom, more especially a heavy metal atom such as for example iron, cobalt, nickel, mercury, palladium, lead, silver, copper, thallium or an organic radical such as for example an acyl, methylol or carbamide group.

As representatives of this class of compounds, there are mentioned by way of example:

Nitrogen sulphide $S_4N_4$

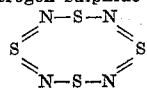

Tetrahydronitrogen sulphide $S_4N_4H_4$

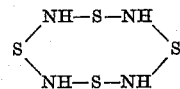

Nitrogen pentasulphide $N_2S_5$ the reaction product of 1 mol of tetrahydronitrogen sulphide and 4 mols of phenylisocyanate:

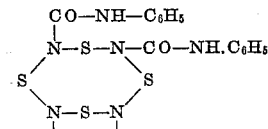

N-methylol-tetrasulphur tetramide $(SN-CH_2OH)_4$

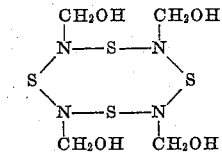

Trithiacyl halide $S_3N_3$—$Hal_3$ (Hal=F, Cl or Br)

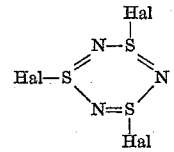

Thiotrithiazyl chloride $S_4N_3Cl$ heptasulphur imide $S_7NH$

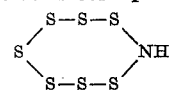

N-methylol heptasulphur imide $S_7N$—$CH_2OH$

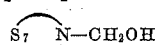

N-acetyl heptasulphur imide $S_7$—N—$COCH_3$

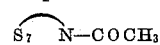

Metal complexes of nitrogen sulphide having the formula $S_4N_4$—Me, in which Me represents for example Co, Pd, Ni, Fe, Pb, Tl, Cu, or Ag. Salts of tetrahydronitrogen sulphide and of heptasulphur imide with heavy metal ions, such as for example Hg(I)—or Hg(II)—ions.

These compounds can be used either separately or in admixture. The said nitrogen sulphide compounds as such are known. The basic substances $S_4N_4$ and $S_7NH$ are readily available by known processes by reacting sulphur chlorides with ammonia (see inter alia Jonas and Knauff: Naturf und Medizin in Deutschland, vol 23 (part 1), page 195).

A number of processes which start from these basic substances and lead to the derivatives mentioned above form the subject of the following publications: A. Meuwsen: Ber., 62 (1929), pages 1959, 1667; M. H. M. Aronld: Soc., 1938, page 1956; O. Glemser, H. Schroder and H. Haeseler: Naturwiss., 1955 (2), page 44; M. Goehring and A Debo: Zeitschr. f. amorg. Chemie, 273 (1953), page 322; M. Goehring and G. Zirker: Zeitschr. f. anorg. Chemie, 285 (1956), page 70; M. Goehring and W. Koch: Naturforsch., 7(b); 1952, page 634.

Compounds with a single ethylenic double bond and also those with several such bonds, such as for example conjugated dienes having 4 to 6 carbon atoms as for instance butadiene, isoprene, dichlorobutadiene, aromatic compounds containing at least one vinyl group such as styrene, esters of acrylic and methacrylic acid with monohydric saturated alcohols such as methanol, ethanol, propanol, butanol, furthermore vinylidenechloride, are to be considered as copolymerization components for carrying out the above process. These components are applied in smaller quantities than the chloroprene preferably in amounts of 0.5 to 20 percent by weight as based on the total monomers.

The polymerization is preferably carried out in aqueous emulsion, using the known emulsifiers and other additives, such as for example regulators. For example 100 parts of monomer can be used to 80 to 800 preferably 80 to 250 parts of water. The quantity of catalyst is preferably in the range of about 0.005 to 2% by weight, the quantity of emulsifiers in the range of about 1 to 10% and the quantity of regulator in the range of about 0.1 to 2% by weight of the monomers used. If the chloroprene is polymerized in the presence of anti-oxidizing agents, these can be used in quantities of about 0.1 to 3%. The pH value of the emulsion mixtures can fluctuate within wide limits, but pH values from 7 to 12, preferably 9 to 12 have proved to be particularly suitable. The polymerization of the said monomers takes place at temperatures of about 40° C., but can be carried out at higher temperatures up to about 110° C. The polymerization is generally terminated after obtaining conversions of about 60 to 90%, by cooling the mixtures to room temperature and/or removing the monomer by steam. It is moreover also possible for the polymerization or copolymerization of the said monomers to take place in bulk, solution or suspension according to methods known per se.

Suitable emulsifiers are for instance alkali metal or ammonium salts of sulfonic acids, such as paraffin sulfonic acids, sulfonated succinic esters, alkylated napthalene sulfonic acid, sulfates of higher fatty alcohols, rosin and rosin derivatives, furthermore quaternary ammonium salts such as lauryl pyridinium chloride, alkali metal salts of fatty acids.

The anti-oxidizing agents which may be used to stabilize the chloroprene are compounds well known in the rubber art where they are added to rubber to prevent its oxidative degradation. These compounds are aromatic hydroxy and amino compounds or derivatives thereof. The aromatic hydroxy compounds include pyrocatechol, hydroquinone, alkylated and styrolized phenols, pyrocatechol and hydroquinone such as p-t-butyl pyrocatechol, p-hydroxydiphenyl, bis[hydroxyphenyl]methanes and alkylated derivatives thereof such as bis-(2-hydroxy-3-tert.butyl-4-methylphenyl) methane, bis-(2-hydroxy-3-cyclohexyl-5-methylphenyl)methane, aminophenols, e.g. p-aminophenol. Suitable amines are primary and secondary aromatic amines such as p,p'-diaminodiphenylmethane, diphenylamine, styrolized diphenylamines, phenyl-alpha-napthylamine phenothiazine and derivatives thereof.

As regulators there come into question the higher aliphatic primary, secondary and tertiary mercaptans having from 8 to 20 carbon atoms such as dodecylmercaptan, octadecylmercaptan, the alkylxanthogenedisulfides, such as diisopropylxanthogene disulfide.

In contrast to the often strong discoloration which occurs when stabilized chloroprene is polymerized with persulphate, the products prepared according to the present process are extremely light in color, even when using a high content of anti-oxidizing agents. Generally, there is only a slight yellowing on exposure to light, but no characteristic brown or red discoloration, as is the case with polymers of stabilized chloroprene prepared by persulphate or oxygen activation.

In contrast to the polymerization of stabilized chloroprene with peroxide or persulphate compounds, the present process offers the advantage that it is possible to dispense with the use of coactivators, that fluctuations in the efficacy of the stabilizers is largely without any influence and consequently characteristic polymerization velocities which are mainly only dependent on the temperature can be produced and that the quantities of persulphate or peroxide compounds, while a good behavior during polymerization is to be observed, even when unusually high additions of stabilizers are employed.

It is also known that chloroprene can also be polymerized in the presence of strong anti-oxidizing agents azonitrile and analogous compounds being used as activators.

As compared with these azonitriles, the nitrogen sulphide compounds according to the present invention have the advantage that the activation can be carried out in a temperature range from 40 to 45° C. with extremely small quantities of activator and that in contrast to the products which are obtained by the known processes, the product prepared at the said temperatures show an average tendency to crystallization which is desirable for many purposes. By using suitable copolymerization components, however, polymers which do not crystallize can also be prepared with the nitrogen sulphide compounds.

In the following examples, the parts indicated are parts by weight.

EXAMPLE 1

The accompanying Figure 1 illustrates the conversions as a function of time which are produced when the following mixtures are polymerized.

100 parts of monomeric chloroprene, which contain 0.4 part of n-dodecyl mercaptan and phenthiazine in the quantities indicated in Figure 1, are emulsified with a solution of 4 parts of the sodium salt of a disproportionated abietic acid, 0.9 part of the sodium salt of naphthalene sulphonic acid formaldehyde condensation product 0.9 part of sodium hydroxide and 0.45 part of potassium persulphate in 150 parts of water and polymerized while stirring in an autoclave at 50° C. The polymerization is stopped by adding 0.1% of phenthiazine.

It is shown that mixtures containing more than 0.07% of phenthiazine can no longer be polymerized. With smaller quantities of phenthiazine, changes in the phenthiazine content of 0.005% cause great changes in the polymerization velocity. The polymerization is stopped with 0.1% of phenthiazine.

EXAMPLE 2

Figure 2:
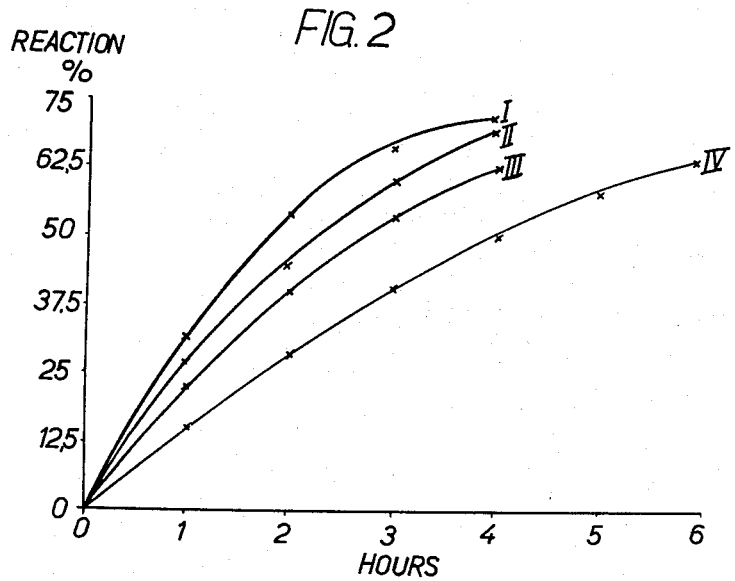

Even if the phenthiazine quantity of the mixture according to Example 1 is increased (for example 0.2%, the said mixture also shows a considerable polymerization velocity if 0.05% of $S_7NH$ is added as activator instead of 0.45% of potassium persulphate. The polymerization temperature is 55° C. Figure 2 shows the course of polymerization of such a mixture for various anti-oxidizing agents when activating with $S_7NH$. 0.2% and 0.1% of phenthiazine are respectively used in mixtures I and II. 0.05% of p-tert.-butyl pyrocatechol are used in mixture III and 0.5% of styrolized diphenylamine are used in mixture IV as the antioxidizing agent. Instead of $S_2NH$ there may also be used the raw product obtained by reacting $S_2Cl_2$ with a surplus of $NH_3$ in a solution of $CCl_4$ said raw product containing about 30% of $S_7NH$ and 65% of S.

EXAMPLE 3

In the same way as described in Example 1, a mixture stabilized with a quantity of 0.2% of phenthiazine is polymerized in an autoclave at 55° C. with additions of 0.3% of $S_4N_4$ or 0.2% of $S_4N_4H_4$ as activators instead of potassium persulphate. While no polymerization occurs when potassium persulphate is used as activators, the mixture polymerizes smoothly with the said nitrogen sulphide compounds.

EXAMPLE 4

Table I gives an indication of the crystallization behavior of the polymers (I) prepared at different temperatures with 0.07% of $S_7NH$ as compared with products which had been prepared with the aid of azodiisobutyric acid dinitrile (II). The Defo values of an unvulcanized mixture of the following composition were measured:

| | Parts |
|---|---|
| Polymeric chloroprene | 100 |
| Phenyl-beta naphthyl amine | 2.0 |
| Light magnesium oxide | 4.0 |
| Active zinc oxide | 3.0 |
| Inactive carbon black | 30.0 |
| Paraffin | 0.6 |
| Stearic acid | 1.0 |
| Vulcanization accelerator | 0.5 | after storage for different periods. The indicated Defo values of the unvulcanized mixture when stored at room temperature represent a standard for the crystallization behavior of the crude material. It is seen that the mixture activated at 50° C. with $S_7NH$ yield polymers which crystallize substantially more quickly at room temperature than the products prepared by using azodiisobutyric acid nitrile. At higher polymerization temperatures (60°), materials which crystallize slightly are also obtained with $S_7NH$.

*Table I*
DEFO VALUES OF THE UNVULCANIZED MIXTURE

| Batch | Polym. temp., degrees | After storage at room temperature | | |
|---|---|---|---|---|
| | | 0 days | 7 days | 14 days |
| I | 60 | 1,800 | 2,400 | 3,250 |
| | 55 | 1,225 | 5,000 | 8,250 |
| | 50 | 1,800 | 5,000 | 9,000 |
| | 45 | 2,400 | 10,000 | 13,000 |
| II | 60 | 2,100 | 2,750 | 3,750 |
| | 55 | 1,325 | 2,000 | 3,200 |
| | 50 | 2,800 | 3,500 | 4,000 |

EXAMPLE 5

A copolymer of chloroprene and vinylidenechloride is prepared as follows:

95 parts of chloroprene
5 parts of vinylidenechloride
0.4 part of n-dodecyl mercaptan
0.1 part of phenthiazine are emulsified in:

150 parts of water,
4 parts of the sodium salt of a disproportionated abietic acid,
0.9 part of the sodium salt of a naphthalene sulphonic acid formaldehyde condensation product,
0.9 part of NaOH, and polymerized at 55° C. with addition of 0.05 part of $S_7NH$. With a yield of 80% the operation is stopped by cooling to room temperature and the mixture is then degasified.

As compared with the pure polymer, the copolymer has the advantage of a low degree of crystallization which is desirable for different purposes. In Table II, the Defo values of the aforementioned unvulcanized copolymer stored at room temperature are compared with the pure polymer. It will be seen that the copolymer has a lower tendency to hardening.

*Table II*
DEFO VALUE OF THE UNVULCANIZED MIXTURE

| after storage at room temperature | | | |
|---|---|---|---|
| 0 days | 7 days | 14 days | |
| 1,225 | 5,000 | 8,250 | pure polymer. |
| 1,600 | 2,400 | 3,000 | copolymer with 5% of vinylidenechloride. |

We claim:
1. A process of polymerizing chloroprene which comprises contacting chloroprene in aqueous dispersion at a pH value of about 7 to 12 and at a temperature of about 40 to 110° C. with about 0.005 to 2%, based on the weight of chloroprene, of a compound consisting of a 6 to 8 membered ring, said ring containing as sole members nitrogen and sulfur atoms and containing at least once a member selected from the group consisting of

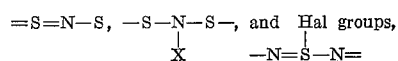

wherein X stands for a member of the group consisting of hydrogen, a metal atom, and an organic radical selected from the group consisting of acyl, methylol and carbonamide radicals, said radicals being devoid of polymerizable linkages, and wherein Hal stands for a halogen atom, thereby causing the chloroprene to polymerize.

2. The process of claim 1 wherein said aqueous dispersion of chloroprene contains a regulating agent selected from the group consisting of alkyl mercaptans of 8 to 20 carbon atoms and alkylxanthogene-disulfides.

3. The process of claim 1 wherein said aqueous dispersion of chloroprene contains an antioxidant selected from the group consisting of aromatic hydroxy and amino compounds, the sole substituents of which are selected from the class consisting of hydroxy, amino, alkyl and cycloalkyl radicals.

4. Process of claim 3 wherein the antioxidant is phenthiazine.

5. Process of claim 3 wherein the antioxidant is p-tert. butyl catechol.

6. Process of claim 1 wherein the chloroprene is copolymerized with about 0.5 to 20% by weight, based on the total weight of monomers, of a compound selected from the group consisting of a further conjugated diene having 4 to 6 carbon atoms, a benzene derivative containing at least one vinyl group, vinylidene chloride, and esters of acrylic and methacrylic acid with monohydric saturated alcohols.

7. A process of polymerizing chloroprene which comprises contacting chloroprene in aqueous dispersion at a pH value of about 7 to 12 and at a temperature of about 40 to 110° C. with about 0.005 to 2%, based on the weight of chloroprene, of a compound consisting of nitrogen sulfide $S_4N_4$, the latter functioning as a polymerization catalyst.

8. A process of polymerizing chloroprene which comprises contacting chloroprene in aqueous dispersion at a pH value of about 7 to 12 and at a temperature of about 40 to 110° C. with about 0.005 to 2%, based on the weight of chloroprene, of a compound consisting of tetrahydronitrogen sulfide $S_4N_4H_4$, the latter functioning as a polymerization catalyst.

9. A process of polymerizing chloroprene which comprises contacting chloroprene in aqueous dispersion at a pH value of about 7 to 12 and at a temperature of about 40 to 110° C. with about 0.005 to 2%, based on the weight of chloroprene, of a compound consisting of heptasulfur imide $S_7NH$, the latter functioning as a polymerization catalyst.

10. A process of polymerizing chloroprene which comprises contacting chloroprene in aqueous dispersion at a pH value of about 7 to 12 and at a temperature of about 40 to 110° C. with about 0.005 to 2%, based on the weight of chloroprene, of a compound consisting of N-methylol heptasulfur imide $S_7N-CH_2OH$.

References Cited in the file of this patent
UNITED STATES PATENTS

| 1,950,438 | Carothers et al. | Mar. 13, 1934 |
| 2,900,358 | Stone et al. | Aug. 18, 1959 |